United States Patent
Luo et al.

(10) Patent No.: US 9,195,562 B2
(45) Date of Patent: Nov. 24, 2015

(54) RECORDING EXTERNAL PROCESSES

(75) Inventors: Yang Luo, Shanghai (CN); Yan-Yan Ou, Shanghai (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/416,110

(22) PCT Filed: Jul. 27, 2012

(86) PCT No.: PCT/CN2012/079244
§ 371 (c)(1),
(2), (4) Date: Jan. 21, 2015

(87) PCT Pub. No.: WO2014/015509
PCT Pub. Date: Jan. 30, 2014

(65) Prior Publication Data
US 2015/0199255 A1    Jul. 16, 2015

(51) Int. Cl.
*G06F 9/44*    (2006.01)
*G06F 11/34*    (2006.01)
*G06F 11/36*    (2006.01)

(52) U.S. Cl.
CPC ........ *G06F 11/3433* (2013.01); *G06F 11/3414* (2013.01); *G06F 11/3636* (2013.01); *G06F 11/3664* (2013.01); *G06F 11/3688* (2013.01)

(58) Field of Classification Search
CPC .................. G06F 11/3688; G06F 11/3664
USPC ................................. 717/124, 126
See application file for complete search history.

(56) References Cited

U.S. PATENT DOCUMENTS

| | | | |
|---|---|---|---|
| 5,526,485 A | 6/1996 | Brodsky | |
| 5,574,854 A * | 11/1996 | Blake | G06F 11/3688 714/28 |
| 5,651,111 A * | 7/1997 | McKeeman | G06F 11/3688 714/38.1 |
| 5,758,061 A * | 5/1998 | Plum | G06F 11/3676 714/35 |
| 6,279,124 B1 * | 8/2001 | Brouwer | G06F 11/263 714/38.11 |
| 6,895,578 B1 * | 5/2005 | Kolawa | G06F 11/3684 714/E11.209 |
| 8,146,057 B1 | 3/2012 | Michelsen | |
| 2007/0168744 A1 * | 7/2007 | Pal | G06F 11/3688 714/38.1 |
| 2008/0086627 A1 | 4/2008 | Splaine et al. | |
| 2009/0089622 A1 | 4/2009 | Qi et al. | |
| 2009/0182753 A1 | 7/2009 | Chang et al. | |
| 2010/0005455 A1 * | 1/2010 | Gyure | G06F 11/3636 717/128 |
| 2011/0283247 A1 | 11/2011 | Ho et al. | |
| 2012/0222014 A1 * | 8/2012 | Peretz | G06F 11/3688 717/125 |

FOREIGN PATENT DOCUMENTS

| | | |
|---|---|---|
| CN | 1619500 A | 5/2005 |
| CN | 1851638 A | 10/2006 |
| CN | 102193796 A | 9/2011 |

OTHER PUBLICATIONS

Ed Glas, Web Test Authoring and Debugging Techniques for Visual Studio 2010, Mar. 23, 2010 (13 pages).

(Continued)

*Primary Examiner* — Phillip H Nguyen
(74) *Attorney, Agent, or Firm* — Hewlett-Packard Patent Department

(57) ABSTRACT

An application under testing is initiated to record reactions of the application responsive to user input. If it is determined that the user input triggers an external process initiated by another program such that the other program precludes recording of the triggered reactions of the external process, an association with the external process is obtained.

14 Claims, 4 Drawing Sheets

(56) References Cited

OTHER PUBLICATIONS

Ivo Ivanov, API Hooking Revealed, Dec. 2, 2002 (26 pages).
Msdn.microsoft.com WinHttpTraceCfg.exe, a Trace Configuration Tool, Jun. 4, 2012 (3 pages).

The State Intellectual Property Office, the P.R. China, International Search Report for PCT/CN2012/079244 dated Sep. 6, 2012 (3 pages).

* cited by examiner

RECORDING EXTERNAL PROCESSES

BACKGROUND

Load testing permits engineers to evaluate the performance of an application exposed to a heavy workload. Such testing may be carried out before a software application is shipped to customers. In load testing, a test engineer may attempt to understand how a human user would interact with the software application and devise a test plan to automate human interaction therewith. These automated human interactions may be conducted with a software testing program, such as the LoadRunner®, WinRunner® and Astra QuickTest® products distributed by the Hewlett-Packard Corporation.

DETAILED DESCRIPTION

Figure 1:
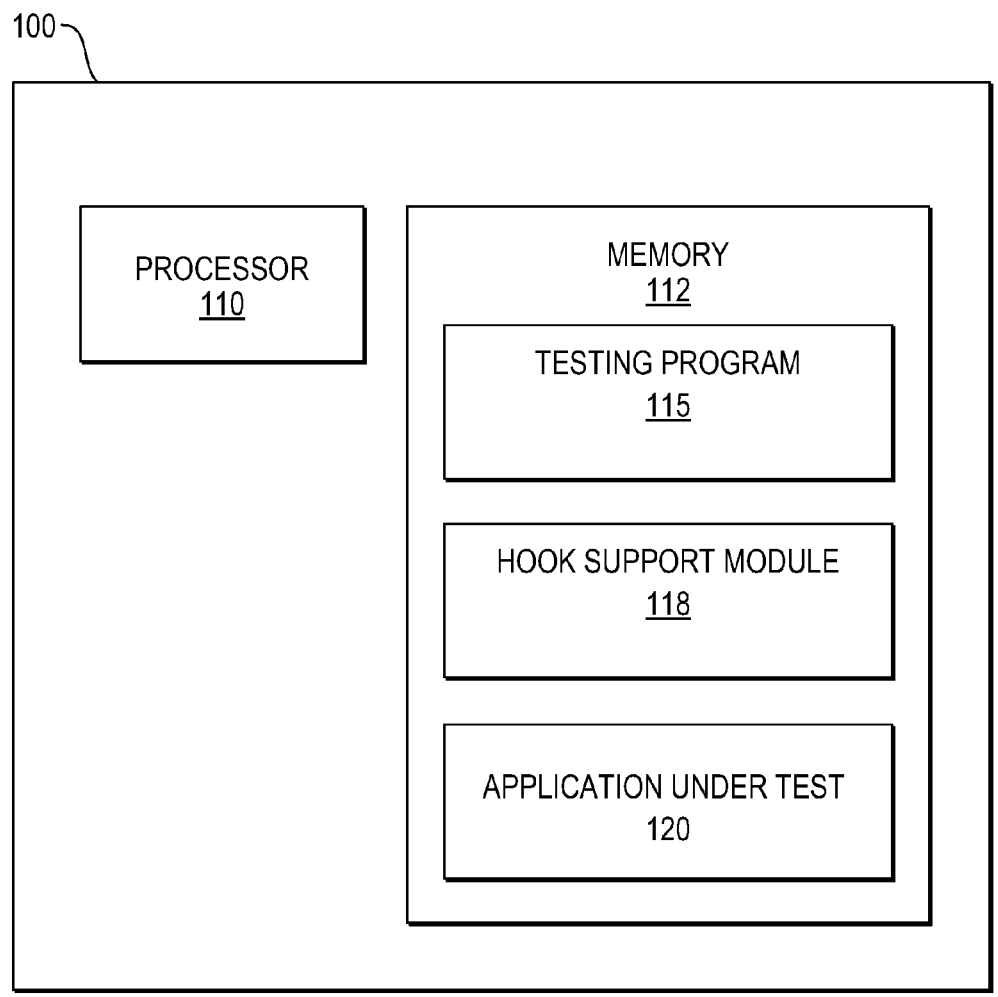
FIG. 1 is a block diagram of an example computer apparatus for enabling the techniques disclosed herein.

Introduction: A test engineer may initiate an application under testing using a testing program and may then interact with the application while the testing program records the application's reactions to user input. The reactions may be recorded in a script and replayed therefrom as many times as needed to simulate the user input and evaluate the performance of the application. Test engineers may execute multiple concurrent instances of these scripts to determine how the application reacts under stress. In one example, a reaction may be defined as function calls, messages, or events transmitted between software components of the application under testing in response to user input. These reactions may be recorded by intercepting them as they occur. In one example, a hook may be defined as the code inserted into an application under testing that intercepts these reactions. The data or traffic intercepted by these hooks may be recorded as functions into the script.

An input by a user may cause an application under testing to call an external process. The external process may be initiated by another program different than the testing program; unfortunately, conventional testing programs insert hooks into processes that are initiated and owned by itself or its descendants. When other programs initiate these external processes, the testing program may be precluded from inserting the necessary hooks therein. For example, in response to user input, a web based application in a Windows operating system may call a component object model ("COM") server. The COM server may be initiated by a program called "svchost.exe." If LoadRunner® is being used as a testing tool, it may not be able to record reactions generated by these COM servers, since these COM servers are initiated and owned by "svchost.exe."

In view of the foregoing, various examples disclosed herein provide a system, non-transitory computer-readable medium, and method that improve the recording of user input with an application under testing. In one example, an application under testing may be initiated to record its reactions to user input. In another example, it may be determined whether the user input triggers an external process initiated by another program that precludes recording of the reactions triggered in the external process. If it is determined that the user input triggers an external process initiated by another program that precludes recording of the triggered reactions, an association with the external process may be obtained to record the reactions thereof.

The techniques disclosed herein allow a testing program to record reactions of a process external to the application to obtain a complete recording of the reactions triggered by user input. As such, when the script containing the reactions is replayed, testers can be sure that the reactions triggered by the script reflect actual conditions. The aspects, features and advantages of the present disclosure will be appreciated when considered with reference to the following description of examples and accompanying figures. The following description does not limit the application; rather, the scope of the disclosure is defined by the appended claims and equivalents. The present disclosure is divided into sections. The first, labeled "Components," describes examples of various physical and logical components for implementing aspects of the disclosure. The second section, labeled "Operation," provides a working example of the computer apparatus, non-transitory computer-readable medium, and method. Finally, the section labeled "Conclusion" summarizes the disclosure.

Components: FIG. 1 presents a schematic diagram of an illustrative computer apparatus 100 depicting various components in accordance with aspects of the present disclosure. The computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface to communicate with other devices over a network using conventional protocols (e.g., Ethernet, Wi-Fi, Bluetooth, etc.).

The computer apparatus 100 may also contain a processor 110 and memory 112. Memory 112 may store instructions that may be retrieved and executed by processor 110. In one example, memory 112 may be a random access memory ("RAM") device. In a further example, memory 112 may be divided into multiple memory segments organized as dual in-line memory modules (DIMMs). Alternatively, memory 112 may comprise other types of devices, such as memory provided on floppy disk drives, tapes, and hard disk drives, or other storage devices that may be coupled to computer apparatus 100 directly or indirectly. The memory may also include any combination of one or more of the foregoing and/or other devices as well. The processor 110 may be any number of well known processors, such as processors from Intel® Corporation. In another example, the processor may be a dedicated controller for executing operations, such as an application specific integrated circuit ("ASIC"). Although all the components of computer apparatus 100 are functionally illustrated in FIG. 1 as being within the same block, it will be understood that the components may or may not be stored within the same physical housing. Furthermore, computer apparatus 100 may actually comprise multiple processors and memories working in tandem.

The instructions residing in memory 112 may comprise any set of instructions to be executed directly (such as machine code) or indirectly (such as scripts) by processor 110. In that regard, the terms "instructions," "scripts," "applications," "programs," "processes," and "modules" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

Testing program 115 may implement the techniques described in the present disclosure and may be realized in any non-transitory computer-readable media. In that regard, memory 112 may be a non-transitory computer-readable media for use by or in connection with an instruction execution system such as computer apparatus 100, an ASIC or other system that can fetch or obtain the logic from non-transitory computer-readable media and execute the instructions contained therein. "Non-transitory computer-readable media" may be any media that can contain, store, or maintain programs and data for use by or in connection with the instruction execution system. Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, or a portable compact disc.

Application under testing ("AUT") 120 may be any client server application being subjected to testing. In one example, AUT 120 may be a web-based application encoded in any suitable web-based computer language, such as JAVA or .NET. Testing program 115 may instruct processor 110 to record the reactions of AUT 120 to user input. Such user input may include a mouse click, entry of login information, or the like. These reactions may be recorded as a series of functions in a script that can be replayed to simulate the user input. As noted above, testing program 115 may insert hooks into AUT 120 to intercept and record its reactions to user input. The same reactions that were triggered during recording may be triggered when an instance of the script is replayed.

Testing program 115 may be any performance and load testing application for examining system behavior and performance while generating actual workload. As noted above, examples of such testing programs may be the LoadRunner®, WinRunner® and Astra QuickTest® programs distributed by Hewlett-Packard. However, it is understood that any appropriate network or load monitoring tool may be augmented to implement the techniques disclosed herein and are considered to be within the scope of the present disclosure. As will be discussed further below, hook support module 118 may be an intermediary module that allows testing program 115 to obtain control of an external process initiated and owned by another program, which in turn permits testing program 115 to record the reactions of the external process triggered by user input into AUT 120.

Figure 2:
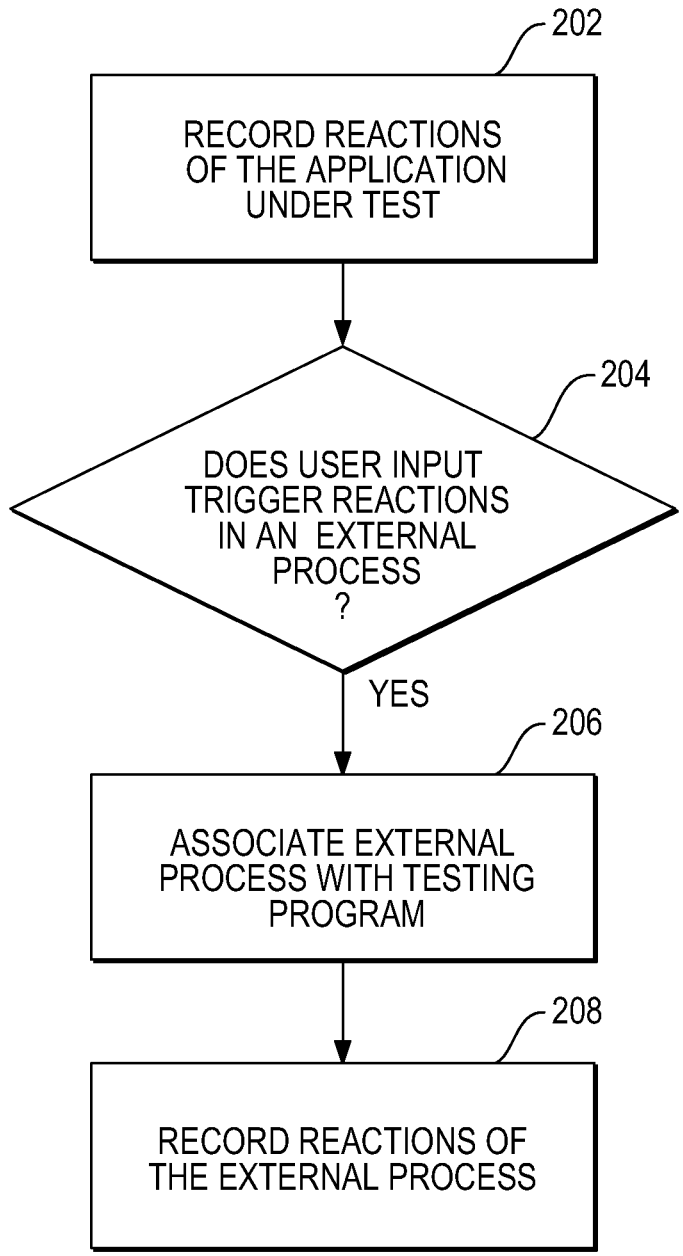
FIG. 2 is a flow diagram of an example method in accordance with aspects of the present disclosure.
Figure 3:
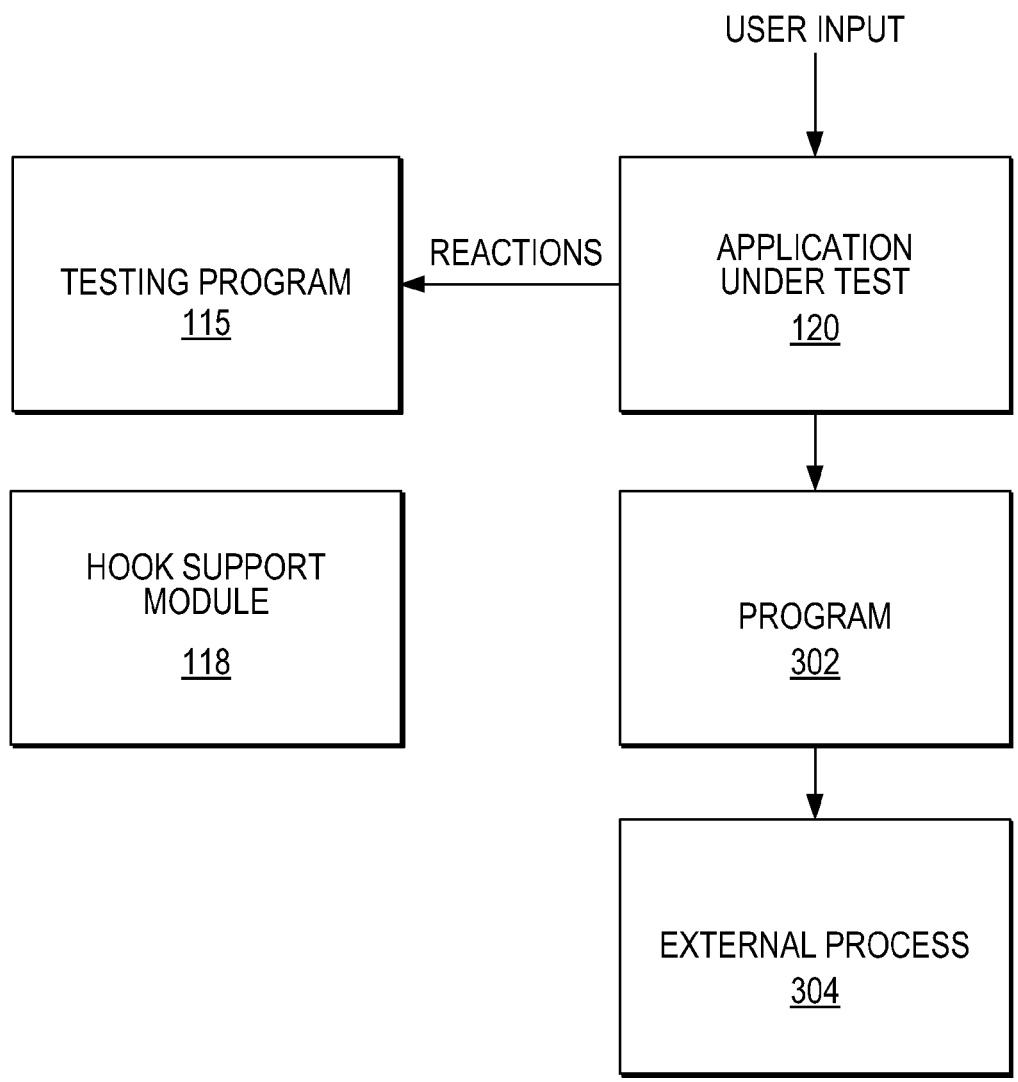
FIG. 3 is a working example in accordance with aspects of the present disclosure.
Figure 4:
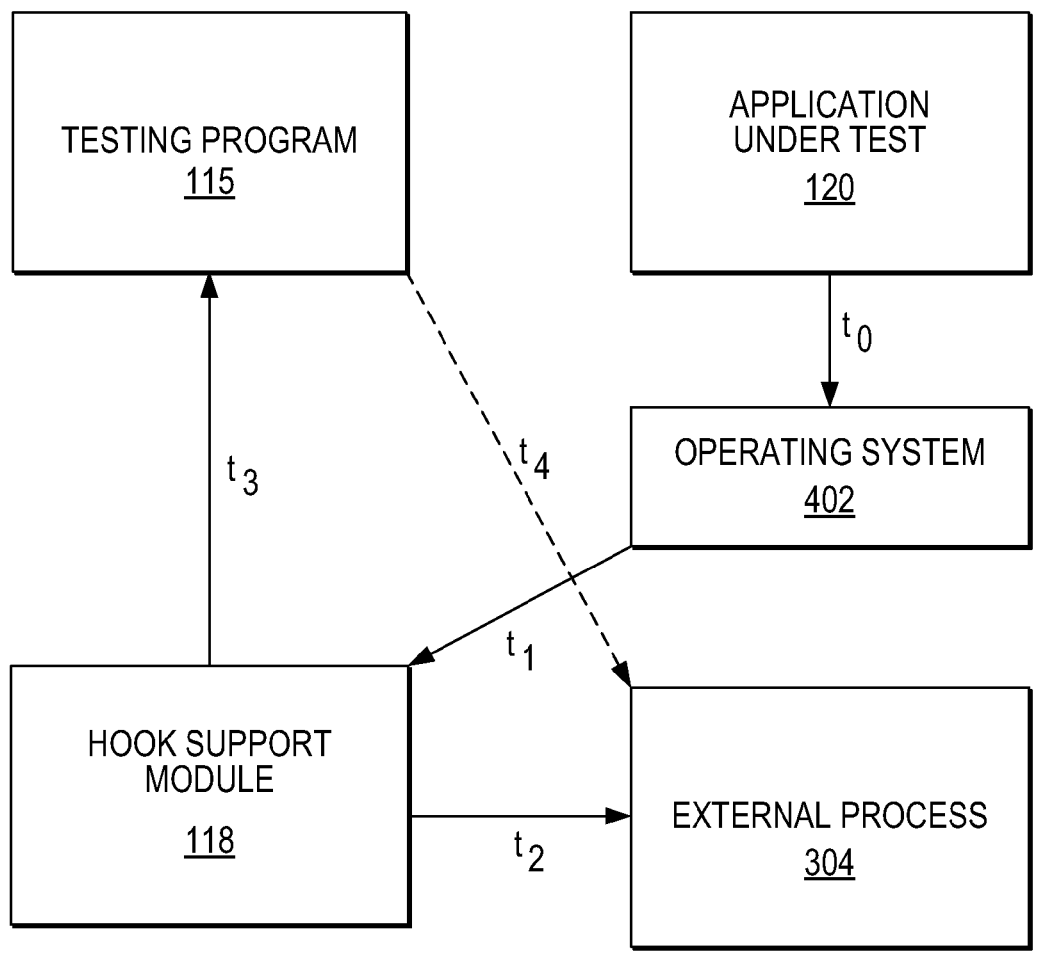
FIG. 4 is a further example in accordance with aspects of the present disclosure.

Operation: One working example of the system, method, and non-transitory computer-readable medium is shown in FIGS. 2-4. In particular, FIG. 2 illustrates a flow diagram of an example method for recording external processes in accordance with aspects of the present disclosure. FIGS. 3-4 show a working example in accordance with the techniques disclosed herein. The actions shown in FIGS. 3-4 will be discussed below with regard to the flow diagram of FIG. 2.

As shown in block 202 of FIG. 2, reactions in an application under testing responsive to user input may be recorded. FIG. 3 shows user input being entered into AUT 120 while testing program 115 records its reactions thereto. Referring back to FIG. 2, it may be determined whether a user interaction triggers a reaction by an external process initiated by another program such that the second program precludes testing program 115 from recording the triggered reactions of the external process, as shown in block 204. Referring back to FIG. 3, program 302 may be the other program in control of external process 304. Program 302 may be a service program responsible for initiating processes that are shared among various applications. One example of such a program is the svchost.exe program of the Windows operating system. Another example may be the internet service daemon of the UNIX operating system, which initiates shared processes associated with internet functionality. These service programs may initiate and own these shared processes, which may prevent testing program 115 from recording reactions triggered therein by user input. In one example, program 302 may prevent testing program 115 from inserting hooks into external process 304.

Referring back to FIG. 2, if it is determined that the user input triggers reactions by an external process initiated by a second program, the external process may be associated with testing program 115, as shown in block 206. Reactions of the external process may be recorded by testing program 115, as shown in block 208. The external process may be associated with testing program 115 in a variety of ways. For example, if testing program 115 executes in a Windows operating system environment, testing program 115 may generate an entry in the Windows registry that associates external process 304 with hook support module 118. Such a registry entry may instruct the Windows operating system to initiate external process 304 in debug mode using hook support module 118, which may pass ownership of external process 304 to testing program 115. The Windows registry is a hierarchical database that stores configuration settings for applications running on the platform. The following is an example Windows registry key that may be inserted by testing program 115:
HKEY_LOCAL_MACHINE\SOFTWARE\Microsoft\ WindowsNT\CurrentVersion\Imag e File Execution Options\{External Process to be recorded}\Debugger={name of hook support module}

If the registry key above exists, the Windows operating system may associate the external process indicated in the key to the value of the key, which may be whatever name is given to hook support module 118. Testing program 115 may enter the registry entry above, if it is determined that the triggered reactions include those of an external process owned by a separate program. To have a thorough recording of AUT 120, it may be necessary to record the reactions of external process 304. Testing program 115 may delete the registry entry to disassociate external process 304 from hook support module 118, when it completes recording the reactions of external process 304. Disassociating external process 304 from hook support module 118 may be tantamount to disassociating external process 304 from testing program 115, since hook support module 118 may serve as an intermediary module that passes ownership of external process 304 to testing program 115. While the example above refers to the Windows operating system, the same functionality may be implemented in other operating systems. For example, in the UNIX or MAC environments, configuration files associated with external process 304 may be altered to start the external process in debug mode and give ownership thereof to testing program 115. As such, it is understood that using the Windows registry is just one example of how testing program 115 may obtain ownership of external process 304 and that other components of a given operating system may be utilized.

FIG. 4 is an example sequence diagram that demonstrates an illustrative series of events that may occur for testing program 115 to take ownership of external process 304 and to record the reactions triggered therein. At time $t_0$, AUT 120 may call a routine or function that is contained in external process 304. In the example of FIG. 4, the call may be forwarded to an operating system 402, which may be a Windows operating system. At time $t_1$, operating system 402 may initiate external process 304 using hook support module 118. If operating system 402 is a Windows operating system, operating system 402 may initiate external process 304 using hook support module 118, if the aforementioned registry entry exists. As noted above, testing program 115 may generate the appropriate association, when it determines that an external process is about to be called. Hook support module 118 may initiate external process 304 at time $t_2$. At time $t_3$, ownership of external process 304 may be provided to testing program 115. At time $t_4$, testing program 115 may record reactions of external process 304 triggered by user input into AUT 120.

Conclusion: Advantageously, the above-described computer apparatus, non-transitory computer readable medium, and method allow test engineers to record external processes called by an application under testing. In this regard, recording of the application may be robust such that the recorded functions are an accurate reflection of the application's reactions to user input. In turn, test engineers may be ensured that each reaction to the user may be recorded and tested.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

The invention claimed is:

1. A system comprising:
   a processor;
   a testing program which, if executed, instructs the processor to:
      initiate an application under testing and record reactions of the application to user input;
      determine whether the user input triggers reactions by an external process initiated by a second program, different from the testing program, such that the second program precludes the testing program from recording the triggered reactions of the external process;
      if the user input triggers reactions by the external process initiated by the second program:
         associate the external process with the testing program;
         initiate the external process; and
         record the reactions of the external process triggered by the user input.

2. The system of claim 1, wherein the testing program further instructs the processor to disassociate the external process from the testing program, when the testing program completes recording the reactions of the external process triggered by the user input.

3. The system of claim 1, wherein to record the reactions of the external process, the testing program further instructs the processor to insert hooks into the external process, the hooks causing the processor to record the reactions of the external process triggered by the user input.

4. The system of claim 1, further comprising a Windows operating system.

5. The system of claim 4, wherein to associate the external process with the testing program, the testing program further instructs the processor to generate an entry in a registry of the Windows operating system that associates the external process with a module such that the module initiates the external process in a debug mode and passes ownership thereof to the testing program.

6. A non-transitory computer-readable medium with instructions stored therein which, if executed, causes a processor to:
   initiate an application under testing and record reactions by the application responsive to user input;
   determine whether the user input causes another program to invoke an external process such that the other program controls the external process and precludes recording of the reactions triggered therein;
   if the user input causes another program to invoke the external process such that the other program precludes the recording:
      associate the external process with a module;
      obtain control of the external process from the module; and
      record the reactions of the external process triggered by the user input.

7. The non-transitory computer readable medium of claim 6, wherein the instructions stored therein, if executed, further causes the processor to disassociate the external process from the module, when recording of the triggered reactions of the external process is complete.

8. The non-transitory computer readable medium of claim 6, wherein the instructions stored therein, if executed, further causes the processor to associate the external process with the module using a registry of a Windows operating system.

9. The non-transitory computer readable medium of claim 8, wherein to associate the external process with the module using the registry, the instructions stored therein, if executed, further causes the processor to enter an association in the registry such that the Windows operating system enables the module to initiate the external process in a debug mode and permits access to the external process.

10. The non-transitory computer readable medium of claim 6, wherein the instructions stored therein, when executed, further causes the processor to insert hooks into the external process, the hooks causing the processor to record the reactions of the external process triggered by the user input.

11. A method comprising:
   recording, using a processor, reactions by an application under testing initiated in response to user input;
   determining, using the processor, whether the user input causes the application under testing to call an external process;
   determining, using the processor, whether a second program initiates the external process such that the second program precludes recording of the reactions triggered in the external process;
   if the user input causes the application to call the external process and the external process is initiated using the second program:
      enabling a module, using the processor, to initiate the external process by associating the module therewith;
      obtaining, using the processor, control of the external process from the module; and
      recording, using the processor, the reactions triggered in the external process by the user input.

12. The method of claim 11, further comprising disassociating, using the processor, the external process from the module, when recording of the triggered reactions of the external process is complete.

13. The method of claim 11, wherein recording the triggered reactions of the external process comprises, inserting, using the processor, hooks into the external process, the hooks recording the reactions of the external process triggered by the user input.

14. The method of claim 11, wherein enabling the module to initiate the external process comprises generating, using the processor, an association in a registry of a Windows operating system such that the module initiates the external process in a debug mode and permits access to the external process.

* * * * *